United States Patent [19]

Schlaff et al.

[11] 4,049,911
[45] Sept. 20, 1977

[54] TALK-THROUGH UNIT WITH VOICE CONTROLLED SWITCHING WITH TURN OFF DELAY VARIABLE FROM 250–500 MILLISECONDS DEPENDING ON VOICE AMPLITUDE

[75] Inventors: Norman Schlaff, Brooklyn; Mario Maltese, Williston Park, both of N.Y.

[73] Assignee: Norcon Electronics Inc., Brooklyn, N.Y.

[21] Appl. No.: 646,918

[22] Filed: Jan. 6, 1976

[51] Int. Cl.² .............................................. H04M 9/10
[52] U.S. Cl. ................. 179/1 H; 179/1 HF; 179/1 VC
[58] Field of Search ................ 179/1 FS, 1 H, 1 HF, 179/1 VC, 1 VE, 100 R, 100 L, 102, 146 R, 179

[56] References Cited

U.S. PATENT DOCUMENTS

| | | | |
|---|---|---|---|
| 3,071,647 | 1/1963 | Grant | 179/1 H |
| 3,751,602 | 8/1973 | Breeden | 179/1 HF |
| 3,849,603 | 11/1974 | Proids | 179/1 H |

FOREIGN PATENT DOCUMENTS 985,408  3/1965  United Kingdom ................ 179/1 H

*Primary Examiner*—George G. Stellar
*Attorney, Agent, or Firm*—Gottlieb, Rackman & Reisman

[57] ABSTRACT

There is disclosed a compact battery-powered, self-contained talk-through unit for passing voice communications through a partition. Typically, the unit is installed in a window partition separating an attendant from the public. Facing the outside of the unit area a microphone and a speaker. Facing the inside, a speaker is mounted within the unit and a microphone is contained at the end of a gooseneck connector. In the quiescent condition, speech from the outside is level-compressed and heard on the inside; speech on the inside, e.g., between two attendants, is not amplified and heard on the outside. It is only when an attendant talks within approximately 2 inches of the gooseneck microphone that the outside-to-inside amplification is turned off and the inside-to-outside amplification is turned on. In this way, the attendant has complete, hands-free control of voice communications; there is no competition between talkers and there is no acoustic feedback.

4 Claims, 5 Drawing Figures

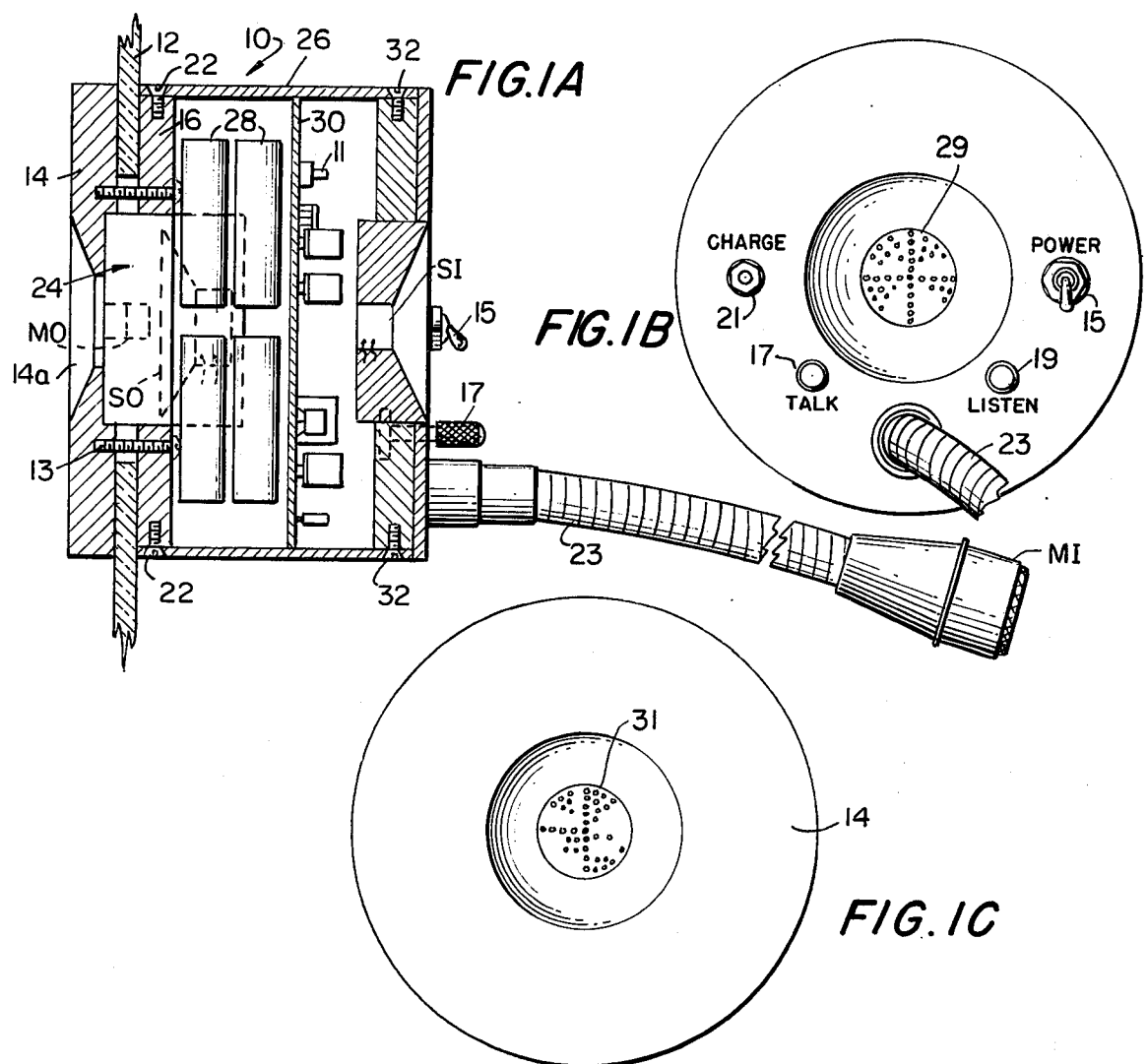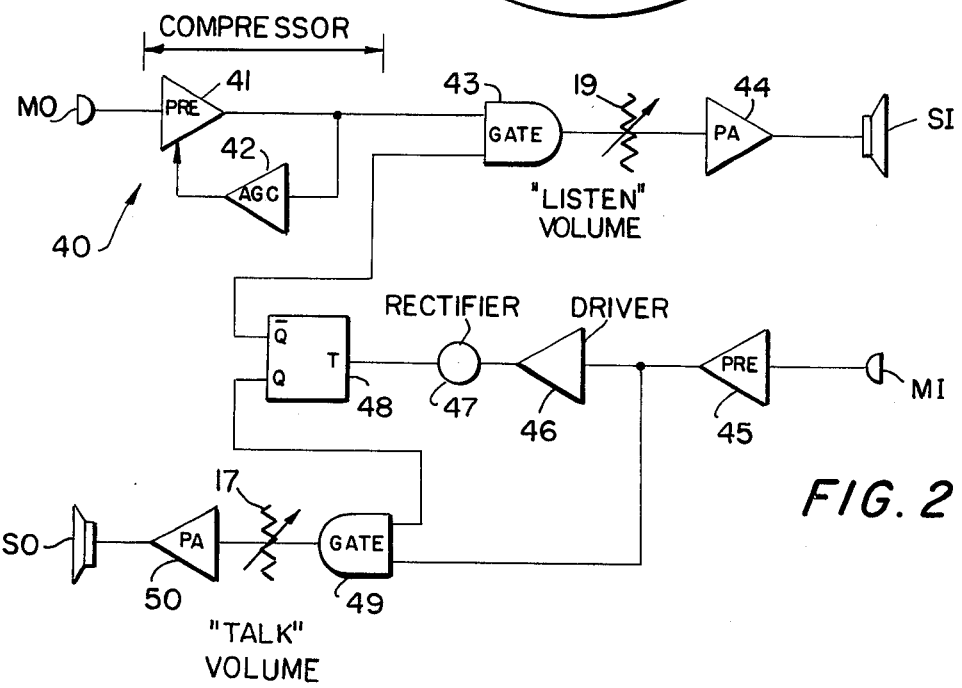

TALK-THROUGH UNIT WITH VOICE CONTROLLED SWITCHING WITH TURN OFF DELAY VARIABLE FROM 250-500 MILLISECONDS DEPENDING ON VOICE AMPLITUDE

This invention relates to talk-through units, and more particularly to such units which are completely self-contained, battery-powered, simple to install, and under the exclusive and hands-free control of an "inside" attendant.

There are many situations in which voice communications must be accomplished through a partition (usually the partition is transparent, although not always). For example, a glass or plastic partition usually separates a ticket seller in a theater from members of the public who desire to purchase tickets. To facilitate voice communications, a metal grille is often provided in the partition. Especially in high-noise environments, the parties may have difficulty in hearing each other through a grille. Also, when it is cold on the outside, the draft through the grille may make it very uncomfortable for the ticket seller on the inside.

For this reason, it is known in the prior art to provide talk-through units which amplify voice communications in both directions. But prior art units have suffered from several disadvantages. Because they have not been self-contained, installation has been a major problem. It is not only that a power line has been required (which, in addition to the cost of installation, generally mars the appearance). Very often the speakers have not been mounted on the units themselves, but have been placed separately, for example, on walls. The reason for doing this is that if on each face of the unit there is mounted a microphone and a speaker, voice communications in one direction can be fed back in the other, thus resulting in "singing". To prevent this type of feedback, a press-to-talk switch may be provided under attendant control, but this does not permit hands-free operation. Alternatively, if a foot switch is provided, installation costs increase and it is bothersome to use. Another serious shortcoming of prior art systems is the difficulty in maintaining a constant outside-to-inside voice level. Depending upon the standing position of the "customer", the level of the speech heard inside the attendant's booth may vary widely.

It is an object of our invention to provide a self-contained, talk-through unit which overcomes the prior art shortcomings.

In the illustrative embodiment of our invention, a battery-powered unit is easily mounted in a circular cutout in a window or other partition. A microphone and speaker are mounted within the unit facing the outside. A speaker is mounted within the unit facing the inside, but the inside microphone is contained at the end of a gooseneck or other elongated connector which comprises part of the overall housing. At any single instant of time, there is amplification of the voice signal in only one direction. In the quiescent condition, the amplification is from outside to inside. This permits the attendant to monitor what is going on outside his booth. The voice signal from outside to inside is level-compressed, that is, the speech which the attendant hears is at a more or less constant level no matter how loud the voice of the outside customer. A control knob permits the attendant to select this level. (Another control knob serves to vary the inside-to-outside amplifications.)

When the attendant desires to talk, he moves his head so that this mouth is within approximately 2 inches of the gooseneck microphone. As soon as a signal is detected, the outside-to-inside amplification is shut off, and the inside-to-outside amplification is turned on. The attendant thus has complete conrol over the communications. The operation is entirely hands-free, and it is a normal reaction for a speaker to move his mouth in proximity to a microphone when he desires to talk; thus the unit is naturally adapted for use and requires no "training" or the learning of "new" manual procedures.

The system is provided with a threshold adjustment which determines the signal level at the inside microphone which controls a switch from outside-to-inside amplification to inside-to-outside amplification. This initial adjustment allows the attendant to tailor the automatic switchover to his own operating procedures and voice level, and the reverberation characteristics of his booth. For example, an attendant who always works alone and who speaks in a soft voice may set a low threshold level. On the other hand, if the booth is often occupied by two attendants, it is wise to set a high threshold level so that their conversation (especially about customers) is not inadvertently amplified and heard on the outside.

During normal speaking, there are numerous short gaps, e.g., between sentences and when pausing to take a breath. To prevent "choppy" voice communications, it is desirable to wait a fraction of a second after the cessation of the attendant's talking before returning the system to its quiescent state, in the event the attendant resumes to speak. For this reason, a short delay is built into the system for preventing a return to the quiescent condition until a fraction of a second after the attendant stops talking; only if he does not resume talking does the system switch back to its quiescent state. Since people who talk in a loud voice usually pause a little longer between speech segments, the system waits longer before turning off the inside-to-outside amplifier when the attendant speaks loudly.

One of the main problems with prior art talk-through units is acoustic feedback; it is possible for speech in one direction to be picked up and amplified in the other direction, giving rise to "singing" or oscillations. In the unit of the invention, for example, speech from the outside of the unit is ordinarily heard on the inside and, were the threshold to be exceeded, the outside-to-inside amplifier would be shut off before the customer finishes to talk. In the past, the microphones and speakers have been mounted separately and apart from each other to avoid this type of acoustic feedback. In the illustrative embodiment of our invention, the problem is avoided by mounting the inside microphone at the end of the gooseneck connector away from the speaker, and by adjusting the system so that sound inside the attendant's booth is not sufficient for controlling an automatic switchover. The attendant need merely speak into his microphone in order for the threshold to be exceeded to switch the amplifiers.

Further objects, features and advantages of our invention will become apparent upon consideration of the following detailed description in conjunction with the drawing, in which:

FIG. 1A is a sectional view through the illustrative embodiment of the invention;

FIG. 1B depicts the face of the unit as seen by the attendant;

FIG. 1C depicts the face of the unit as seen by an outside customer;

FIG. 2 is a block diagram schematic of the system logic; and

Figure 3:
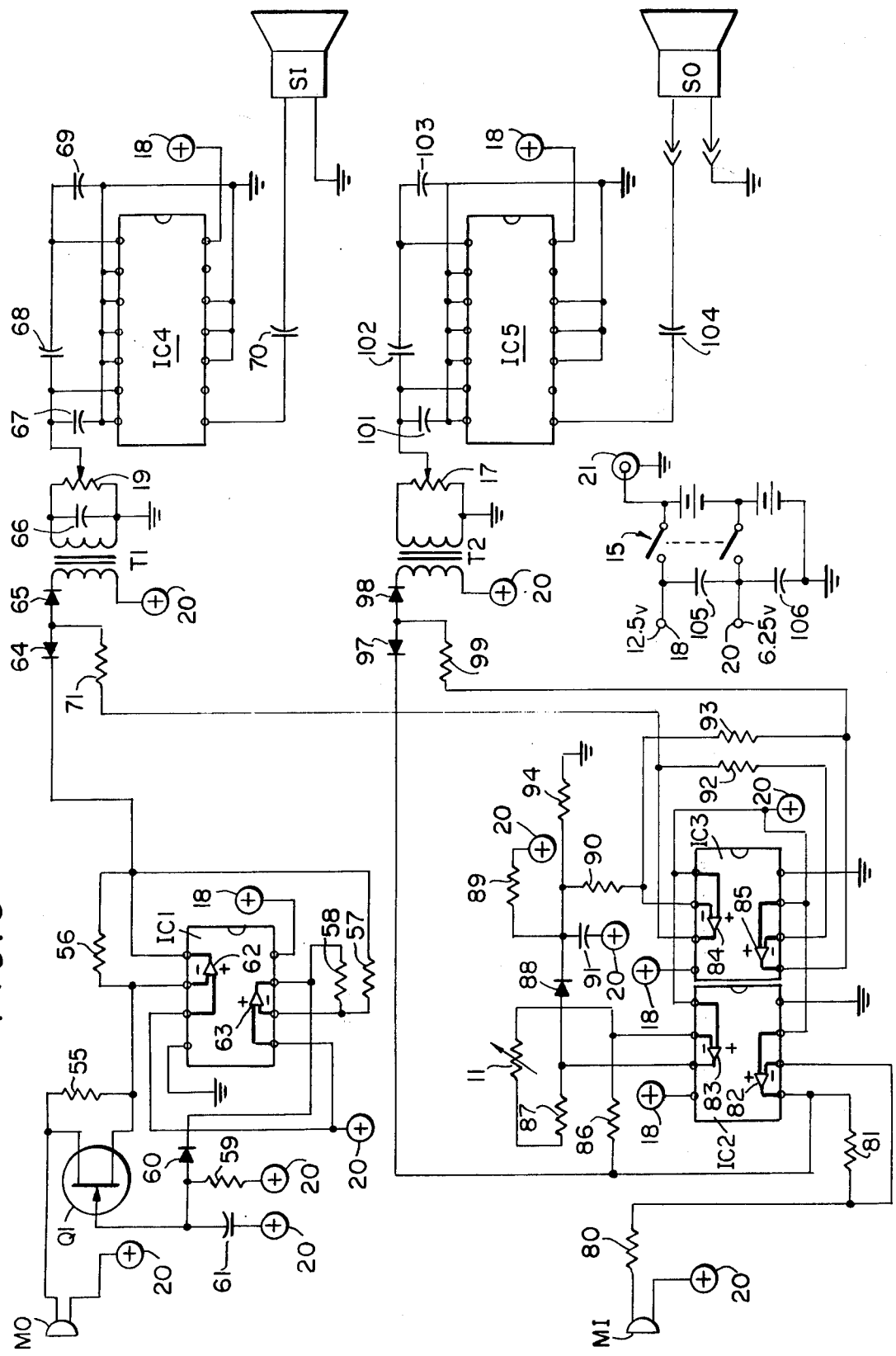
FIG. 3 is a detailed schematic of the illustrative embodiment of the invention.

The unit 10 of FIG. 1A consists of three parts which permit rapid mounting. The outer part 14 is simply a circular plate with a central conical cut-out 14a and a perforated grille 31 (FIG. 1C), and it is provided with four screw holes for insertion of screws 13. Part 16 is simply a circular plate with a central cut-out and four holes for allowing screws to pass through. The first step in mounting the unit is to place parts 14 and 16 on opposite sides of a partition 12 which contains a cut-out made for the purpose of the unit's installation. Four screws 13 are then used to secure the two parts to each other on opposite sides of the partition.

The third part 26 contains the working elements of the system. It is fitted against plate 16, with the outside microphone/speaker assembly 24 inserted through the cut-out in plate 16 and partition 12. In the drawing, the symbol MO represents the "outside microphone" and the symbol SO represents the "outside speaker". Part 26 includes a cylindrical sleeve, the end of which fits over plate 16. Four screws 22 are used to secure the sleeve to the plate, thus completing the installation.

Within part 26 there are ten 1.25-volt batteries, shown by the numeral 28. These batteries are mounted in two planes, the five batteries in each plane being arranged around the periphery of the unit in the shape of a pentagon. The batteries are connected in series (not shown) in order to provide a 12.5-volt supply.

A circuit board 30 is mounted within the unit, the circuit board containing the various electrical components included in the system. The detailed mounting of the components on the board is not important for an understanding of the invention, it being understood that FIG. 1 is designed to depict the overall arrangement, rather than structural details. However, attention should be paid to potentiometer 11 mounted on the circuit board. This potentiometer serves as the threshold adjustment. Access to the potentiometer is gained by removing four screws 32 which secure the circular sleeve to a front plate assembly in the system. By removing the front plate assembly, the potentiometer can be adjusted.

On the inside of the unit, an "inside speaker" SI is mounted. The "inside microphone" MI is secured at the end of 12-inch gooseneck connector 23. In general, microphone MI is preferably mounted at least several inches (i.e., three inches) in front of speaker SI.

On the inside face of the unit, as seen most clearly in FIG. 1B, there are provided a grille 29 for permitting sound from speaker SI to pass through, a main power switch 15 and a charging jack 21 for allowing the batteries to be recharged. A conventional charging circuit (not shown) can be used with the system, the batteries (preferably, of the nickel-cadmium type) being recharged, for example, overnight when the unit is not in use. Also mounted on the inside face of the unit are two potentiometer control knobs 17 and 19 for respectively adjusting the voice level on the outside of the unit (talk) and the inside of the unit (listen).

FIG. 2 depicts the block diagram schematic of the system. Preamplifier 41 and automatic gain control circuit 42, arranged in a feedback configuration, comprise a level compressor; the output of outside microphone MO is amplified, the amplification depending on the signal level, and a relatively constant signal level is applied to the signal input of gate 43. The control input of the gate is connected to the Q output of monostable multivibrator 48. In the quiescent condition, the Q output is high so that gate 43 is enabled and speech from outside the booth is passed through the gate. Power amplifier 44 amplifies the signal and applies it to inside speaker SI. Potentiometer 19 controls the level of the speech heard by the attendant.

When the attendant speaks into the inside microphone, the signal is preamplified by amplifier 45 and applied to the signal input of gate 49. The control terminal of the gate is connected to the Q output of multivibrator 48. Until the multivibrator is switched to the 1 state, gate 49 remains off. It is only when the multivibrator is switched that gate 49 is enabled, at which time power amplifier 50 applies an amplified signal to the outside speaker SO. Potentiometer 17 controls the outside speech level.

Elements 46 and 47 determine when multivibrator 48 is switched to the 1 state, thereby enabling gate 49 and disabling gate 43. The signal at the output of preamplifier 45 is amplified by driver 46, and the amplified signal is rectified by rectifier 47. Although not shown in FIG. 2, a threshold control (potentiometer 11 in FIG. 1) is provided for controlling the level at the output of the rectifier which triggers the multivibrator. When the threshold level is exceeded, the multivibrator is switched to the 1 state. The inside-to-outside amplification persists to the exclusion of the outside-to-inside amplification until after a fraction of a second has elapsed following the cessation of speech by the attendant.

The detailed circuit is shown in FIG. 3. The system includes three integrated circuits IC1, IC2, and IC3, each of which is a dual 741C type operational amplifier. Each of these eight-pin packages contains two difference amplifiers shown symbolically in the drawing. The difference amplifiers are shown only to facilitate an understanding of the signal flow. The pins of each integrated circuit are numbered 1 through 8 in the counter-clockwise direction, starting with the upper right-hand corner. There are two power supplies for the integrated circuits, the numerals 18 and 20 being used to designate them. As shown at the bottom of FIG. 3, the ten batteries are arranged in series to provide a 12.5-volt potential at terminal 18. Terminal 20 is connected to the center of the battery string to provide a 6.25-volt potential. The batteries function to power the system only when the main power switch 15 is closed. In order to charge the batteries, a low DC current is applied from a conventional charging circuit at charging jack 21. Capacitors 105 and 106 are standard filter capacitors known in the art.

Amplifier 62 in integrated circuit IC1 provides preamplification for the signal picked up by outside microphone MO. Resistor 56 is a feedback resistor coupled from the output of the amplifier to the input. The amplification is approximately equal to the magnitude of resistor 56 divided by the input resistance between the microphone and the input terminal of amplifier 62 (pin 2). This latter resistance is the parallel combination of resistor 55 and the channel resistance of FET transistor Q1. When the transistor is fully conducting, its channel resistance is low and thus the overall amplification is high. When the transistor is not conducting, the channel resistance is high and the overall amplification is low.

The overall amplification is approximately 50 when the transistor conducts, and approximately 2 when the transistor does not conduct. Depending on the DC potential at the transistor gate, the overall amplification varies between 2 and 50.

The output of amplifier 62 is extended through resistor 57 to an input of amplifier 63. Resistor 58 is a standard feedback resistor connected between the output of the amplifier and its input. The output of the amplifier is extended through diode 60 to the junction of resistor 59 and the gate of transistor Q1. Source 20 controls a positive potential at the gate of transistor Q1, the output of diode 60 decreasing the magnitude of the potential as the AC signal at the outputs of amplifiers 62 and 63 increases. As the outputs of amplifiers 62 and 63 tend to increase, the gate potential of transistor Q1 tends to decrease, thus reducing the overall amplification. It is this feedback arrangement which provides the level compression, i.e., a relatively constant signal level at the output of amplifier 62 which is independent of the speech level at the input of microphone MO. Capacitor 61 shorts out high frequencies so that the overall amplification remains a function of the average speech level rather than varying with instantaneous changes in level. Amplifier 63 and transistor Q1 thus provide automatic gain control and eliminate the need for the attendant to constantly vary the "listen" volume control depending upon the voice levels of different customers. The circuitry associated with integrated circuit IC1 corresponds to elements 41 and 42 on FIG. 2.

Diodes 64 and 65 correspond to gate 43 on FIG. 2. The left end of resistor 71 varies in potential between approximately +5.5 and −5.5 volts. In the quiescent condition, the potential is +5.5 volts so that each of diodes 64 and 65 is forward biased. The signal at the output of amplifier 62 (a few hundred millivolts) is thus extended through the gate to the primary winding of transformer T1. The transformer has a turns ratio of 1:100 and thus boosts the signal voltage, as well as isolating the power amplifier from the preamplifier. Capacitor 66 functions to flatten the response of microphone MO. A typical microphone has a greater response to higher frequencies and the capacitor attentuates them. Potentiometer 19 is the "listen" control shown on FIG. 1B. It is the signal at the potentiometer tap which controls the voice level inside the attendant's booth.

Integrated circuit IC4 is an LM380P type, 2.5-watt power amplifier. It is arranged in a standard configuration as is known in the art, capacitors 67, 68 and 69 being standard stabilizing capacitors which are recommended for audio applications. The output of the integrated circuit (at pin number 8 when counting starting at the upper right-hand corner and going in the counterclockwise direction) is coupled to one input of inside speaker SI through decoupling capacitor 70, the other input to the speaker being grounded.

The inside microphone MI is coupled through resistor 80 to an input of difference amplifier 82. Feedback resistor 81 and source resistor 80 are selected to provide modest amplification (approximately 15) to overcome attentuation introduced by the gate comprising diodes 97 and 98, the signal at the output of amplifier 82 being extended through the gate (comparable to gate 49 on FIG. 2) to the power amplifier which amplifies the attendant's speech. The outpuf of amplifier 82 is also extended through resistor 86 to an input of amplifier 83. This amplifier corresponds to driver 46 in FIG. 2 and provides the additional amplification necessary for triggering the multivibrator. The output of the amplifier is fed back to the input through resistor 87 and potentiometer 11, this potentiometer being set to control the threshold level. The output of the amplifier is extended through diode 88, this diode and capacitor 91 serving to provide a positive rectified signal indicative of the attendant's average speech level. It is the positive potential which is extended through resistor 90 to the negative input of amplifier 84 which functions to trigger the multivibrator, amplifiers 84 and 85 corresponding to multivibrator 48 on FIG. 2.

It is a sufficiently high positive potential at the cathode of diode 88 which maintains the multivibrator in the 1 state so that it is the attendant's speech which is amplified to the exclusion of the customer's speech. The setting of potentiometer 11 controls the overall amplification of amplifier 83 since the potentiometer is in the feedback path of the amplifier. It is by initially setting potentiometer 11 that the attendant can adjust the unit to his particular requirements.

Capacitor 91 charges to the average potential at the cathode of diode 88. When the attendant ceases to talk, the capacitor discharges through resistor 89 to source 20, through resistor 94 to ground, and through resistor 90. Not until the capacitor discharges below the threshold level does the multivibrator switch back to the 0 state. Consequently, the greater the potential across capacitor 91, the longer it takes for the multivibrator to switch back to the 0 state after the attendant has stopped talking. It will be noted that the louder the speech level of the attendant, the higher the potential across capacitor 91. Consequently, the delay between the cessation of the attendant's talking and the automatic switch-over of the multivibrator varies in direct proportion to the attendant's speech level. This is a desirable characteristic because in most cases it has been found that the louder the speaking voice of the attendant, the longer the pauses taken. In general, depending on the setting of potentiometer 11, it requires between 250 and 500 milliseconds after the cessation of speech of the attendant before the outside-to-inside amplifier is turned back on.

The multivibrator itself consists of amplifiers 84 and 85 arranged in a standard configuration. The output of amplifier 84 is coupled via resistor 92 to an input of amplifier 85 and the output of amplifier 85 is coupled through resistor 93 to an input of amplifier 84. With a positive potential being extended through resistor 90 when the attendant is talking, the output of amplifier 84 is negative. The negative potential is extended through resistor 71 to the junction of diodes 64 and 65, thus back-biasing these diodes so that outside-to-inside amplification is cut off. Conversely, when the output of amplifier 84 is positive, diodes 64 and 65 are turned on. While it is the output of amplifier 84 that controls the gate comprising diodes 64 and 65, it is the output of amplifier 85 which is extended through resistor 99 to the junction of diodes 97 and 98 to control the inside-to-outside amplification. It is only when the output of amplifier 85 is positive that the attendant's speech is amplified and heard on the outside.

The power amplifier for driving outside speaker SO operates similarly to the power amplifier for driving inside speaker SI. Just as potentiometer 19 controls the amplified voice level on the inside, potentiometer 17 controls the amplified voice level on the outside. It should be noted that potentiometers 17 and 11 are independent of each other, the former controlling the attendant's amplified speech level and the latter determining whether there is any amplification in the first place. It is important to provide not only an adjustable speech level, but also an adjustable threshold. For example, many attendants keep a radio on while sitting in their booth and the threshold level must be adjusted to make certain that the level is not exceeded by the playing of a radio. An increased threshold level simply requires the attendant to talk close into the inside microphone in order to switch the amplifiers.

It should be noted that in the illustrative embodiment of the invention capacitor 66 is placed across the secondary winding of transformer T1 while no such capacitor is placed across the secondary winding of transformer T2. Outside microphone MO is in front of speaker SO; the microphone is therefore relatively small (Dynamagnetic Devices model D457). This microphone is also quite sensitive as it should be to pick up sound even if the customer does not speak directly into it. But because the microphone has a peak response to high frequencies, capacitor 66 is utilized to attenuate them. Inside microphone MI, on the other hand, is not limited in size and is far less sensitive (Shure model 561). Because it does not exhibit a peak response to high frequencies, there is not need for a capacitor comparable to capacitor 66. Because one transformer circuit includes a capacitor and the other does not, the best performance is achieved by using different-valued potentiometers across the secondary windings. Potentiometer 19 has an impedance of 50K, while potentiometer 17 has an impedance of 5K. In the illustrative embodiment of the invention, each speaker is a 2-inch Oxford model 2PX12-S.

It is desirable to provide acoustic isolation of the two speakers from the other elements in the housing. Techniques for doing this are well known in the art; for example, each speaker may be surrounded by acoustic absorbent material contained, in a hard enclosure.

In the preferred embodiment of the invention, transistor Q1 is of type 2N5949. All diodes are of type HEP170. The resistor and capacitor component values are as follows:

| Resistor | Value | Capacitor | Value |
| --- | --- | --- | --- |
| 11 | 1M | 61 | 5 mfd |
| 55 | 56K | 66 | .1 mfd |
| 56 | 100K | 67 | 120 pf |
| 57 | 20K | 68 | 120 pf |
| 58 | 100K | 69 | 5 mfd |
| 59 | 100K | 70 | 220 mfd |
| 71 | 1K | 91 | 10 mfd |
| 80 | 1K | 101 | 120 pf |
| 81 | 15K | 102 | 120 pf |
| 86 | 1k | 103 | 5 mfd |
| 87 | 1K | 104 | 220 mfd |
| 89 | 10K | 105 | 220 mfd |
| 90 | 1K | 106 | 220 mfd |
| 92 | 470K | | |
| 93 | 470 K | | |
| 94 | 100K | | |
| 99 | 1K | | |

Although the invention has been described with reference to a particular embodiment, it is to be understood that this embodiment is merely illustrative of the application of the principles of the invention. For example, instead of using batteries to power the unit a line cord could be extended to the unit, although this is not as pleasing aesthetically. Thus it is to be understood that numerous modifications may be made in the illustrative embodiment of the invention and other arrangements may be devised without departing from the spirit and scope of the invention.

What we claim is:

1. A self-contained, talk-through unit comprising a housing adapted for mounting on a partition, a first speaker and a first microphone contained in said housing and facing in a first direction, a second speaker and a second microphone contained in said housing and facing in an opposite direction, said housing including connecting means extending in said opposite direction with said second microphone being mounted at the end thereof at least several inches away from said second speaker, first amplifying means contained in said housing for amplifying a signal at said first microphone and for driving said second speaker, said first amplifying means including level-compression means for reducing variations in the output level of said second speaker in the presence of voice level variations in the vicinity of said first microphone, second amplifying means contained in said housing for amplifying a signal at said second microphone and for driving said first speaker, control means contained in said housing for normally enabling said first amplifying means and disabling said second amplifying means, sensing means contained in said housing responsive to the signal at said second microphone exceeding a pre-set threshold level for disabling said first amplifying means and for enabling said second amplifying means, means for holding said second amplifying means enabled and for holding said first amplifying means disabled for a fraction of a second ranging from 250 to 500 milliseconds even after the signal at said second microphone drops below said pre-set threshold level, said fraction of a second being proportional to the signal level at said second microphone during the operation of said sensing means, and battery means contained in said housing for powering said first and second amplifying means, said control means and said sensing means.

2. A self-contained, talk-through unit in accordance with claim 1 further including first means for adjusting the output level of said first speaker and second means for adjusting the output level of said second speaker.

3. A self-contained, talk-through unit in accordance with claim 2 further including means for adjusting said pre-set threshold level, said last-mentioned means being operative to adjust said pre-set threshold level independent of said first and second output level adjusting means.

4. A self-contained, talk-through unit in accordance with claim 1 further including means for adjusting said pre-set threshold level.

* * * * *